United States Patent
Scalfari

(10) Patent No.: US 6,964,408 B1
(45) Date of Patent: Nov. 15, 2005

(54) CABLE ADJUSTMENT TOOL

(76) Inventor: Louis Scalfari, 1617 Country Rd. 109E, Lady Lake, FL (US) 32159

(*) Notice: Subject to any disclaimer, the term of this patent is extended or adjusted under 35 U.S.C. 154(b) by 64 days.

(21) Appl. No.: 10/684,455

(22) Filed: Oct. 14, 2003

(51) Int. Cl.[7] .............................................. B21F 9/00
(52) U.S. Cl. ....................... 254/234; 403/344; 403/296
(58) Field of Search .......................... 254/13, 14, 17, 254/29 A, 231, 234, 235; 24/68 CT, 68 TT, 24/68 D, 275, 277, 278; 403/343, 344, 296; 81/73, 77

(56) References Cited

U.S. PATENT DOCUMENTS

| | | | |
|---|---|---|---|
| 548,795 A | 10/1895 | Barrett | |
| 1,147,318 A * | 7/1915 | Fulford | 254/234 |
| 1,263,867 A * | 4/1918 | Davidson | 254/29 A |
| 2,375,548 A * | 5/1945 | Gilmore | 403/180 |
| 3,065,007 A * | 11/1962 | Colmer, Jr. | 403/45 |
| 3,267,775 A * | 8/1966 | Talley | 81/480 |
| 3,338,359 A * | 8/1967 | Baillie et al. | 192/43.1 |
| 3,983,605 A | 10/1976 | Willenbring | |
| 4,573,823 A * | 3/1986 | Dennis | 403/118 |
| 4,617,703 A | 10/1986 | Schaeffer | |
| 4,830,339 A * | 5/1989 | McGee et al. | 254/235 |
| D319,561 S | 9/1991 | Moses | |
| 5,184,805 A * | 2/1993 | Frizot | 254/29 A |
| 5,533,709 A * | 7/1996 | Tarbell | 254/13 |
| 5,611,521 A * | 3/1997 | Grover et al. | 254/235 |
| 5,934,342 A | 8/1999 | Danielson | |
| 5,967,691 A * | 10/1999 | Lancelot, III | 403/313 |
| 6,073,642 A * | 6/2000 | Huang | 135/114 |

* cited by examiner

Primary Examiner—Emmanuel M Marcelo

(57) ABSTRACT

A cable adjustment tool includes an upper bar and a lower bar each having a top side, a bottom side, a first end and a second end. The first end of the upper bar has a slot extending therein for receiving a first of a pair of lug nuts. The first end of the lower bar has an indentation extending therein for receiving a second of the lug nuts. A threaded rod is attached to and extends between upper and lower bars such that the indentation and the slot are substantially aligned. The rod has a break therein. A sleeve has a threaded bore extending therethrough that has first half having a first direction of threads and a second half having a second direction of threads. The rod is threadably coupled to the sleeve. Rotation of the sleeve moves the upper and lower bars with respect to each other.

5 Claims, 3 Drawing Sheets

CABLE ADJUSTMENT TOOL

BACKGROUND OF THE INVENTION

1. Field of the Invention

The present invention relates to cable adjusting devices and more particularly pertains to a new cable adjusting device for loosening or tightening cables used for the positioning of bowling pins.

2. Description of the Prior Art

The use of cable adjusting devices is known in the prior art. U.S. Pat. Nos. 3,983,605 and 2,3754,548 are two of these types of devices. While these devices fulfill their respective, particular objectives and requirements, the need remains for a device that allows a person to safely tighten or loosen cables used in bowling alley pin-setting machines which determine placement of the pins on the bowling alley.

Such cables include a pair of cable sections that attached together by a coupler. Each of the cables have a lug nut attached thereto wherein the lug nuts are rotated in the same direction with respect to each other to either tighten or loosen the cable. However, the person performing this task must engage each other lug nuts with a wrench while preventing the rotation of the coupler. Because of the difficulty involved in this proceeded, the person must either attempt to perform it, at great risk, by themselves, or a second person must be brought in to aid in the procedure. Due to these complications, time and manpower are both wasted in an industry in which speed of repair is highly valued as bowling patrons may not continue until the cable is properly adjusted.

SUMMARY OF THE INVENTION

The present invention meets the needs presented above by providing a single tool to engage both lug nuts so that they may be simultaneously rotated with one hand while the connected is stabilized with the other hand.

To this end, the present invention generally comprises an upper bar having a top side, a bottom side, a first end and a second end. The first end has a slot extending therein for receiving a first of the lug nuts. A lower bar has a top side, a bottom side, a first end and a second end. The first end of the lower bar has an indentation extending therein for receiving a second of the lug nuts. A rod is attached to and extends between the bottom side of the upper bar and a top side of the lower bar such that the indentation and the slot are substantially aligned. The rod is threaded and has a break therein. A sleeve has an upper end and a lower end. The sleeve has a threaded bore extending through the upper and lower ends. The threaded bore has first half having a first direction of threads and a second half having a second direction of threads. The rod is positioned in and is threadably coupled to the sleeve. Rotation of the sleeve in a first direction moves the upper and lower bars toward each other and rotation of the sleeve in a second direction moves the upper and lower bars away from each other.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
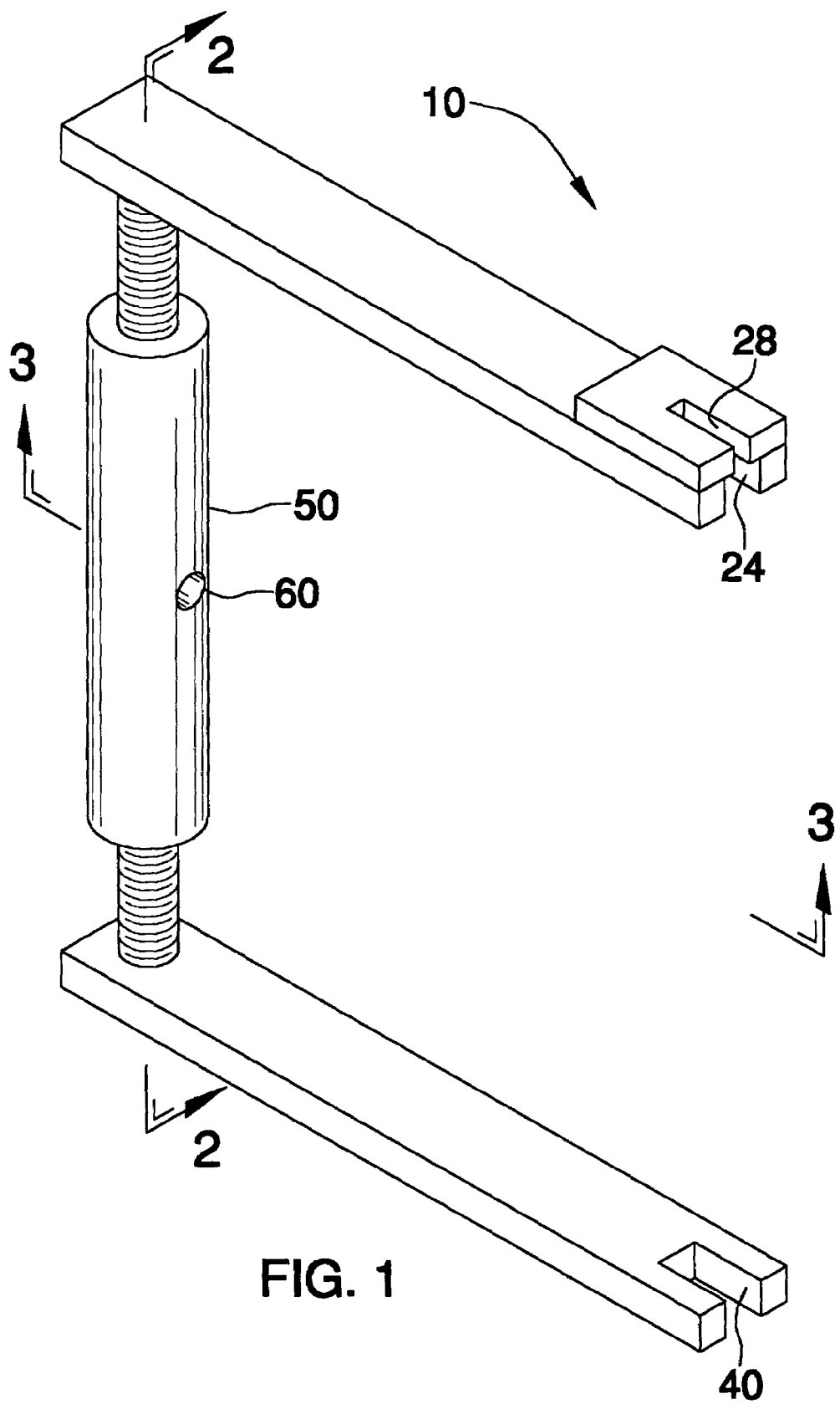
FIG. 1 is a schematic perspective view of a cable adjustment tool according to the present invention.
Figure 2:
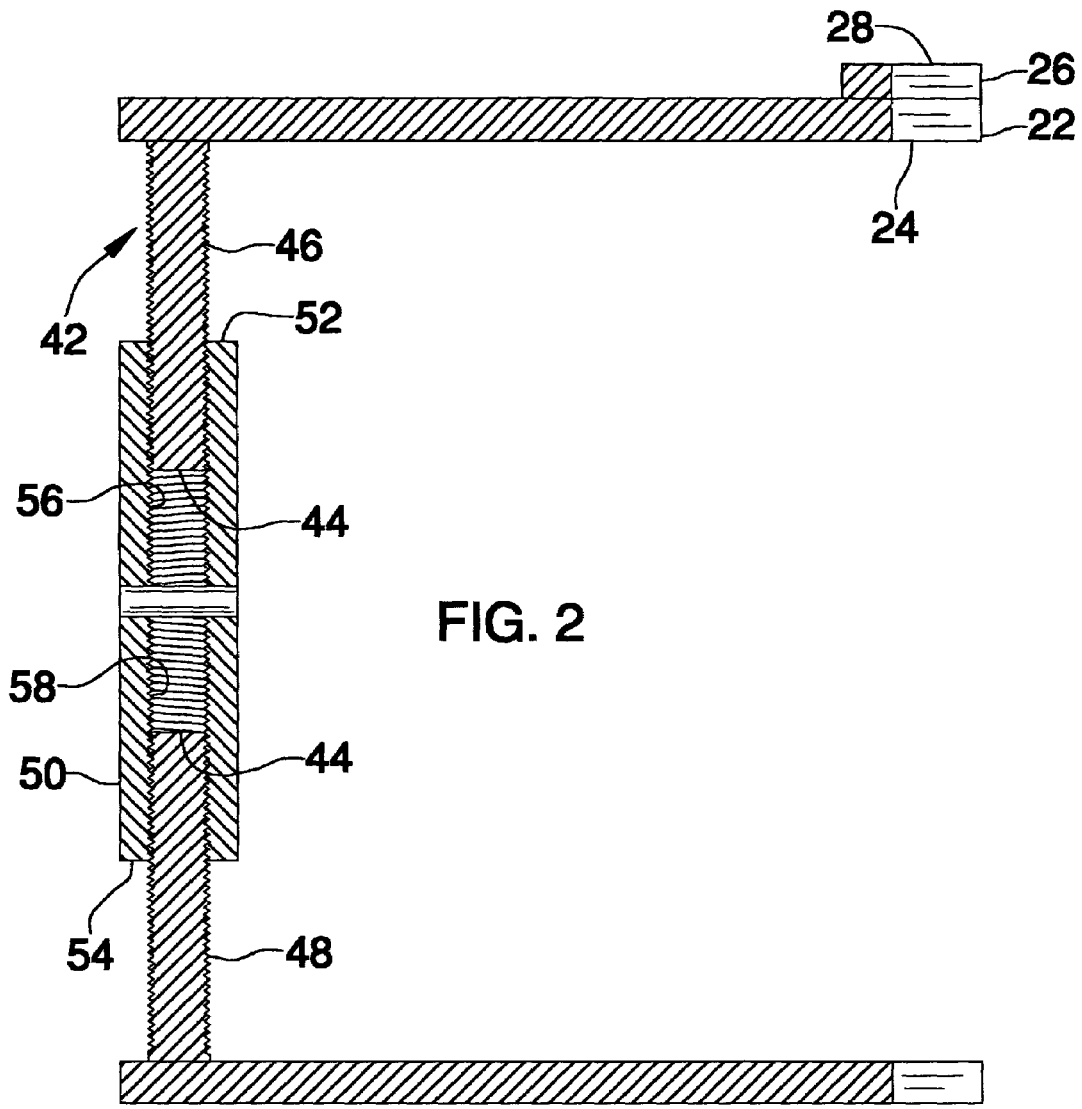
FIG. 2 is a schematic cross-sectional view taken along line 2—2 of FIG. 1 of the present invention.
Figure 3:
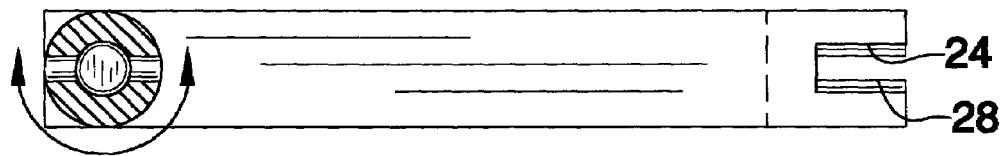
FIG. 3 is a schematic cross-sectional view taken along line 3—3 of FIG. 1 of the present invention.
Figure 4:
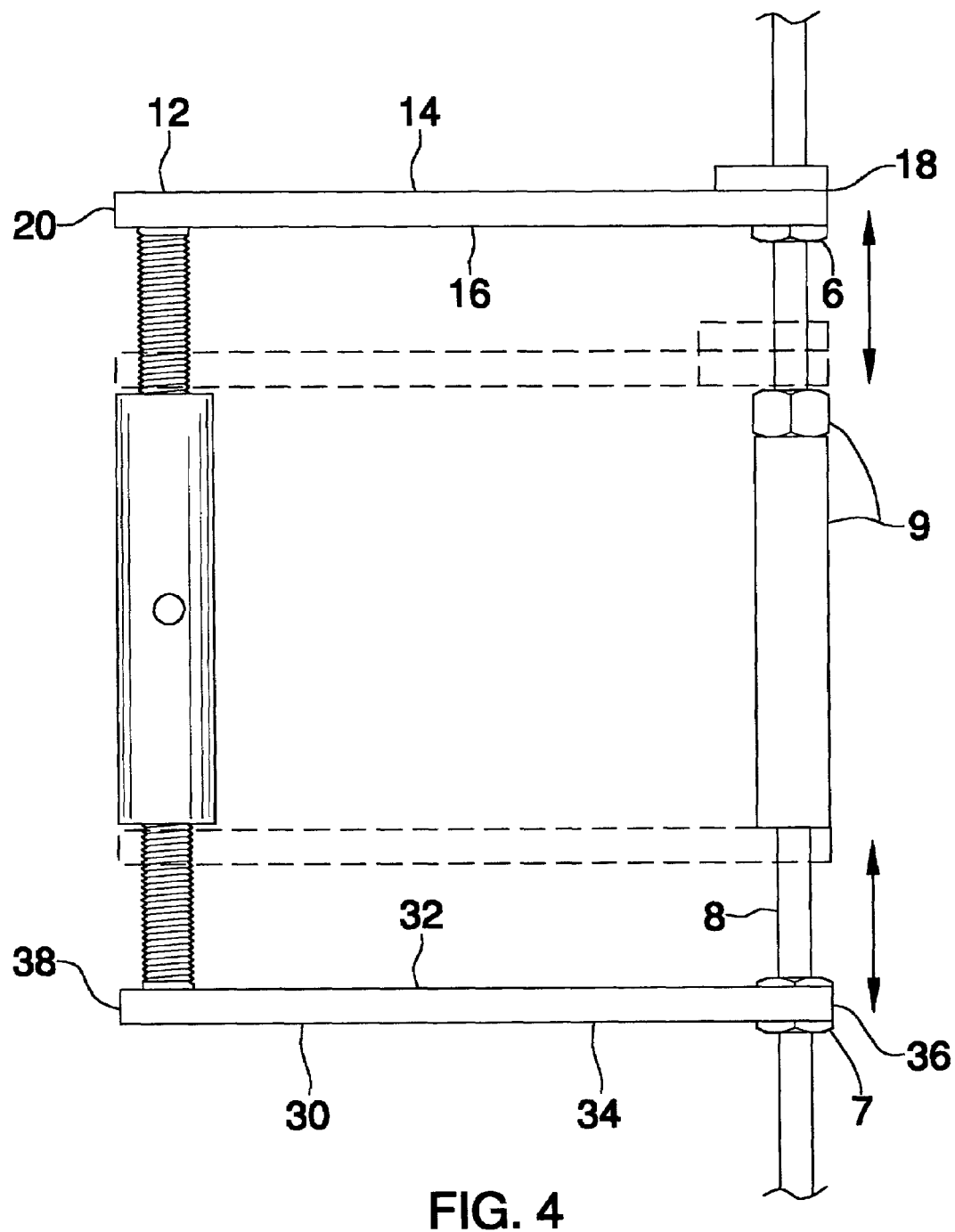
FIG. 4 is a schematic side view of the present invention.

With reference now to the drawings, and in particular to FIGS. 1 through 4 thereof, a new cable adjusting device embodying the principles and concepts of the present invention and generally designated by the reference numeral 10 will be described.

As best illustrated in FIGS. 1 through 4, the cable adjustment tool 10 generally comprises an upper bar 12 having a top side 14, a bottom side 16, a first end 18 and a second end 20. The first end 18 has a bottom portion 22 abutting the bottom side 16 that has a slot 24 extending therein for receiving a first 6 of a pair of lug nuts 6, 7 attached to a cable 8 to be adjusted. The slot 24 has a width between ½ inch and ⅝ inch and preferably equal to 9/16 inch. The first end 18 has an upper portion 26 abutting the top side 14 that has a notch 28 extending therein for receiving the cable 8. The notch 28 has a width less a width of the slot 24 and preferably than ½ inch.

A lower bar 30 has a top side 32, a bottom side 34, a first end 36 and a second end 38. The first end 36 of the lower bar 30 has an indentation 40 extending therein for receiving a second 7 of the lug nuts.

The indentation 40 has a width between ½ inch and ⅝ inch and preferably equal to 9/16 inch. The upper and lower bars each preferably have a length between 5 inches and 7 inches.

A rod 42 is attached to and extends between the bottom side 16 of the upper bar 12 and a top side 32 of the lower bar 30 such that the upper 12 and lower 30 bars are orientated substantially parallel to each other and the indentation 40 and the slot 24 are substantially aligned. The rod 42 is positioned adjacent to the second ends 20, 38 of the upper 12 and lower 30 bars. The rod 42 is threaded and preferably has a centrally disposed break 44 therein such that a first portion 46 and a second portion 48 of the rod 42 are defined.

A sleeve 50 having an upper end 52 and a lower end 54 has a threaded bore extending therethrough such that the bore travels through the upper 52 and lower 54 ends. The threaded bore has a first half 56 having a first direction of threads and a second half 58 having a second direction of threads. The first portion 46 is extended into the upper end 52 and the second portion 48 is extended into the lower end 54 such that the first 46 and second 48 portions are threadably coupled to the sleeve 50. Rotation of the sleeve 50 in a first direction moves upper 12 and lower 30 bars toward each other and rotation of the sleeve 50 in a second direction moves the upper 12 and lower 30 bars away from each other.

The sleeve may have a transverse aperture 60 with respect to a longitudinal axis of the sleeve 50 for selectively receiving another tool, such as a screwdriver, for aiding rotation of the sleeve 50. It is preferred that the maximum length achievable between the upper 12 and lower 30 bars is 7 inches and the minimum distance is 3 inches.

In use, the upper 12 and lower 30 bars are spaced from each other a distance generally equal to a distance between the lug nuts 6, 7. The first 6 of the lug nuts is positioned in the slot 24 and the second 7 of the lug nuts is positioned in the indentation 40. The user grips the sleeve 50 and rotates the sleeve 50 around the cable 8 so that the lug nuts 6, 7 are rotated. The cable 8 has a pair of ends threadably attached to a connector 9 and as the lug nuts 6, 7 are rotated, the cable 8 is either lengthened or shortened depending on the rotation of the sleeve 50 around the cable 8. The sleeve 50 is threaded so that the upper 12 and lower 30 bars move with the lug nuts 6, 7 as they move either further away or closer to the connector 9. It is preferred that the tool 10 includes the notch 28 for receiving the cable 8 but which is too small for first lug nut 6 to pass through. This adds stabilization to the tool 10.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cable adjustment tool for engaging a pair of lug nuts attached to a cable and spaced from each other, said tool comprising:
    an upper bar having a top side, a bottom side, a first end and a second end, said first end having a slot extending therein for receiving a first of the lug nuts;
    a lower bar having a top side, a bottom side, a first end and a second end, said first end of said lower bar having an indentation extending therein for receiving a second of the lug nuts;
    a rod being attached to and extending between said bottom side of said upper bar and said top side of said lower bar such that said indentation and said slot are substantially aligned, said rod being threaded and having a break therein; and
    a sleeve having an upper end and a lower end, said sleeve having a threaded bore extending through said upper and lower ends, said threaded bore having first half having a first direction of threads and a second half having a second direction of threads, said rod being positioned in and threadably coupled to said sleeve, wherein rotation of said sleeve in a first direction moves said upper and lower bars toward each other and rotation of said sleeve in a second direction moves said upper and lower bars away from each other.

2. The tool of claim 1, wherein said slot has a width between ½ inch and ⅝ inch and said indentation has a width between ½ inch and ⅝ inch.

3. A cable adjustment tool for engaging a pair of lug nuts attached to a cable and spaced from each other, said tool comprising;
    an upper bar having a top side, a bottom side, a first end and a second end, said first end having a bottom portion abutting said bottom side having a slot extending therein for receiving a first of the lug nuts, said first end having an upper portion abutting said top side having a notch extending therein for receiving the cable, said notch having a width less than a width of said slot;
    a lower bar having a top side, a bottom side, a first end and a second end, said first end of said lower bar having an indentation extending therein for receiving a second of the lug nuts;
    a rod being attached to and extending between said bottom side of said upper bar and said top side of said lower bar such that said indentation and said slot are substantially aligned, said rod being positioned adjacent to said second ends of said upper and lower bars, said rod being threaded, said rod having a break therein such that a first portion and at a second portion of said rod are defined; and
    a sleeve having an upper end and a lower end, said sleeve having a threaded bore extending through said tipper and lower ends, said threaded bore having first half having a first direction of threads and a second half having a second direction of threads, wherein said first portion is extended into said upper end and said second portion is extended into said lower end such that said first and second portions are threadably coupled to said sleeve, wherein said rotation of said sleeve in a first direction moves upper and lower bars toward each other and rotation of said sleeve in a second direction moves said upper and lower bars away from each other.

4. The tool of claim 3, wherein said slot has a width between ½ inch and ⅝ inch and said indentation has a width between ½ inch and ⅝ inch.

5. A cable adjustment tool for engaging a pair of lug nuts attached to a cable and spaced from each other, said tool comprising:
    an upper bar having a top side, a bottom side, a first end and a second end, said first end having a bottom portion abutting said bottom side having a slot extending therein for receiving a first of the lug nuts, said slot having a width between ½ inch and ⅝ inch, said first end having an upper portion abutting said top side having a notch extending therein for receiving the cable, said notch having a width less than ½ inch;
    a lower bar having a top side, a bottom side, a first end and a second end, said first end of said lower bar having an indentation extending therein for receiving a second of the lug nuts, said indentation having a width between ½ inch and ⅝ inch;
    a rod being attached to and extending between said bottom side of said upper bar and said top side of said lower bar such that said upper and lower bars are orientated substantially parallel to each other and said indentation and said slot are substantially aligned, said rod being positioned adjacent to said second ends of said upper and lower bars, said rod being threaded, said rod having a break therein such that a first portion and a second portion of said rod are defined; and
    a sleeve having an upper end and a lower end said sleeve having a threaded bore extending through said upper and lower ends, said threaded bore having first half having a first direction of threads and a second half having a second direction of threads, wherein said first portion is extended into said upper end and said second portion is extended into said lower end such that said first and second portions are threadably coupled to said sleeve, wherein rotation of said sleeve in a first direction moves said upper and lower bars toward each other and rotation of said sleeve in a second direction moves said upper and lower bars away from each other.

* * * * *